(No Model.)
J. H. CROSKEY & J. LOCKE.
PNEUMATIC APPARATUS FOR LIFTING AND DISCHARGING MOLTEN MATERIAL.
No. 575,214. Patented Jan. 12, 1897.
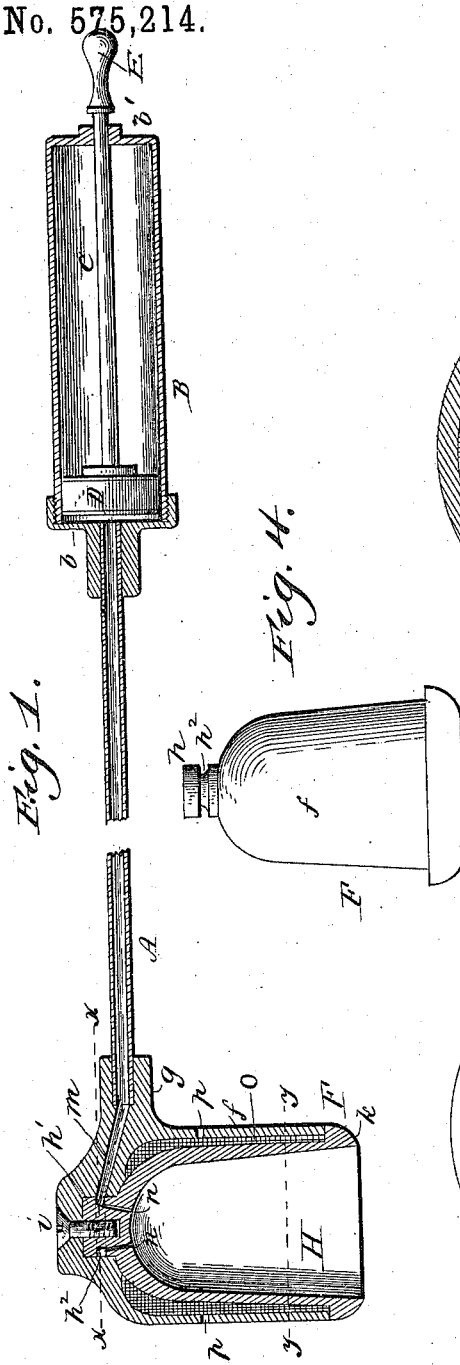
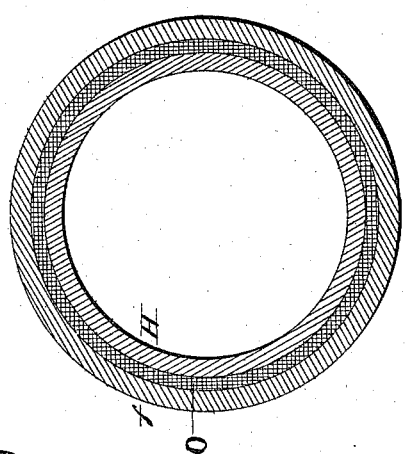
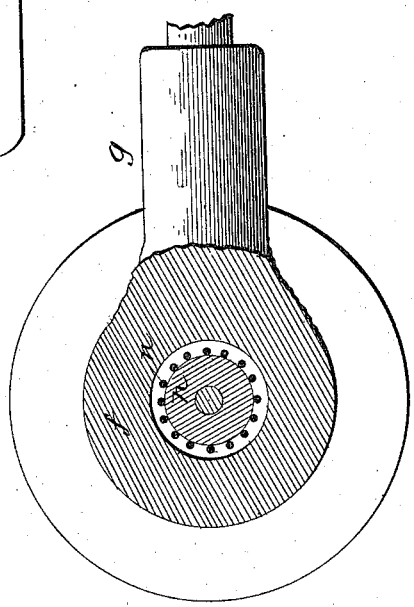

UNITED STATES PATENT OFFICE.

JOHN H. CROSKEY AND JOSEPH LOCKE, OF PITTSBURG, PENNSYLVANIA, ASSIGNORS OF ONE-HALF TO JOHN H. PHILLIPS AND GEORGE W. MORSE, OF SAME PLACE.

PNEUMATIC APPARATUS FOR LIFTING AND DISCHARGING MOLTEN MATERIAL.

SPECIFICATION forming part of Letters Patent No. 575,214, dated January 12, 1897.

Application filed September 19, 1896. Serial No. 606,409. (No model.)

*To all whom it may concern:*

Be it known that we, JOHN H. CROSKEY and JOSEPH LOCKE, citizens of the United States, residing at Pittsburg, in the county of Allegheny and State of Pennsylvania, have invented certain new and useful Improvements in Pneumatic Apparatus for Lifting and Discharging Molten Material; and we do hereby declare the following to be a full, clear, and exact description of the invention, such as will enable others skilled in the art to which it appertains to make and use the same.

This invention has relation to a novel tool or apparatus which is intended and adapted for the use of glass or metal workers for the purpose of gathering or lifting definite quantities of molten material, such as glass, iron, or other metals, and conveying the same to molds. Heretofore the glass-worker or metal-molder in taking glass from the melting-pot or metal from the melting-furnace has adopted either the gathering or ladling process. In "gathering" glass from the melting-pot to be afterward conveyed to the glass-mold it has been customary to use a gathering-rod, which, being inserted in the molten glass and deftly manipulated, takes up or "gathers" such an amount of glass as the gatherer judges to be proper and sufficient, but no means other than the eyesight and judgment of the gatherer has been employed in determining the exact amount of glass required. Hence considerable waste, loss of time, and imperfect results have followed the use of the gathering-rod or blowpipe. In some cases ladles have been used in conveying the glass from the melting-pot to the mold, as well as in conveying molten metal from the melting-furnace to the metal-mold, but the ladling of glass and molten metals is attended with many difficulties and is impossible if the melting pot or furnace is of such a size and shape that the ladle cannot be dipped into the metal or glass to withdraw a definite or measured quantity of the material.

The object of our invention is to provide a novel tool or apparatus comprising a cup-shaped receptacle for the molten glass or metal, a tubular stem, and an air-pump by which the molten material may be withdrawn from the melting pot or furnace in a definite and exact quantity and amount by suction, and after being conveyed to the mold can be forced out of the receptacle into the mold by air-pressure, the air-pump serving both as a suction and pressure pump and as a means for forming the articles in the mold by such pressure.

Our invention consists in the novel construction and combination of parts hereinafter described and claimed.

In the accompanying drawings, Figure 1 is a central longitudinal section of the tool or apparatus embodying our invention. Fig. 2 is a section on the line $x\ x$ of Fig. 1. Fig. 3 is a section on the line $y\ y$ of Fig. 1, and Fig. 4 is a detail view.

A designates the handle by which the tool is carried and manipulated, and said handle consists of a metallic pipe or tube of about the size and length of the ordinary blowpipe used by glass-blowers. Upon one end of this tube is fitted an air-pump B of any ordinary or suitable construction, but preferably of the form of an oblong cylinder having bored and bossed ends $b\ b'$, into one of which is screwed the rear end of the tube A, while through the other the piston-rod C, having on one end the piston D and on the other end the hand-piece or knob E, reciprocates. Upon the other or outer end of the tube A is fitted the cup-shaped receptacle F, which consists of a cylindrical casing $f$, having a lateral boss $g$, into which is screwed or otherwise fastened the end of the tube A, and the inner vessel H, having tapered or converging walls and a semispherical top or upper part. From the outer surface of the upper part of this inner vessel a boss $h$ projects and enters a corresponding socket $h'$, formed interiorly in the upper part of the casing $f$. This boss is centrally screw-tapped, and a screw $i$, inserted through a proper hole in the top of the casing $f$, secures the casing $f$ and inner vessel H together. The vessel H terminates at its rim in a projecting flange or shoulder $k$, which fits closely against the rim of the casing $f$ and is beveled or rounded off on its outer surface to allow it to be easily inserted into the molten material of which it is to receive a charge. The boss $h$ is formed with a circular groove $h^2$, which communicates with the bore of the tube A through a channel $m$, formed in the casing $f$, and also communicates with the interior of the vessel H through minute holes $n$, extending from the groove $H^2$ to and through the inner surface of the rounded top of the vessel H. As will be observed, a narrow space is left between the outer surface of the vessel H and the casing F. This space is filled with asbestos or other refractory and absorbent material O, which is kept moistened by water when the tool is in use. The casing F has several holes $p$ bored through its walls to admit water to the asbestos filling, the vessel $f$ being dipped in a tank of water from time to time, so as to keep the asbestos constantly saturated and the apparatus cool.

The vessel H is of a capacity which is determined by the specific uses to which it is put and is designed and adapted to receive and hold exactly enough glass or metal to fill the mold which it is to supply. In practice and where molds of different sizes are used a number of casings $f$, with their inner vessels H, will be employed, and these will of course be of different sizes. In using the tool or apparatus the pipe A is grasped in one hand, or the other hand takes hold of the knob E on the end of the piston-rod C. The piston D being pressed inwardly, the vessel H is inserted, mouth or open end downward, into the molten material which is to be lifted. The piston is now drawn back, thus exhausting the air from the vessel H and causing the molten material to rise by suction into the vessel H and exactly fill it. The apparatus with its charge of molten material is now conveyed to the mold, the vessel H being preferably turned so that its mouth or open end will be upward. The vessel H being now held in proper position over the mold, its contents are discharged by forcing inward the piston D and causing the air to press upon the contents of the vessel H.

By proper management of the apparatus and suitable manipulation of the piston the contents of the vessel H may be discharged gradually or very quickly and suddenly.

The interior of the vessel H is preferably made tapering, so that no obstruction will be offered to its being readily filled and emptied, but may be made cylindrical, if desired.

Having described our invention, what we claim, and desire to secure by Letters Patent, is—

1. The herein-described tool or apparatus for lifting, conveying, and discharging molten material comprising a tubular handle, an air-exhausting device attached to said handle and communicating with the bore thereof and a cup adapted to contain molten material attached to one end of said handle and communicating with the bore thereof, substantially as set forth.

2. The herein-described tool or apparatus for lifting, conveying and discharging molten material consisting of the air-pipe A, the air-exhauster B connected to one end of said pipe and the cup-shaped receptacle F adapted to contain molten material attached to the other end of said pipe with its axis out of alinement with the pipe and communicating with the bore thereof, substantially as set forth.

3. The herein-described tool or apparatus for lifting, conveying and discharging molten material consisting of the rigid tubular handle A, the air-pump B attached to one end of said handle and the cup-shaped receptacle F adapted to contain molten material attached to the other end of said handle and communicating through the same with the air-pump, substantially as set forth.

4. The combination with the tube A, of a receptacle for molten material, consisting of the casing $f$ and an inner vessel H, detachable therefrom and communicating with the bore of the tube A, and a suitable air-pump attached to and communicating with the bore of the tube A, substantially as described.

5. In a tool or apparatus for the purposes described the combination of the tube A, casing $f$ having openings $p$, inner vessel H, said vessel H communicating with the bore of the tube A, and an asbestos or other refractory filling between the casing $f$ and the vessel H, substantially as described.

6. In a tool or apparatus for the purpose described, the combination with the tube A and the casing $f$ attached thereto and having a recess in its upper end, of the vessel H having the circumferentially-grooved boss $h$, with holes or piercings $n$, communicating with the bore of the tube A, substantially as described.

In testimony whereof we affix our signatures in presence of two witnesses.

JOHN H. CROSKEY.
JOSEPH LOCKE.

Witnesses:
M. B. BATES,
W. L. RODLEY.